US009721072B2

(12) United States Patent
Maughan et al.

(10) Patent No.: US 9,721,072 B2
(45) Date of Patent: *Aug. 1, 2017

(54) SYSTEMS AND METHODS FOR PROVIDING AUTOMATIC CONTENT RECOGNITION TO VERIFY AFFILIATE PROGRAMMING

(71) Applicant: Rovi Guides, Inc., San Carlos, CA (US)

(72) Inventors: Benjamin H. Maughan, Pleasanton, CA (US); Jason Manasse, Manhattan Beach, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,466

(22) Filed: May 4, 2016

(65) Prior Publication Data

US 2016/0306952 A1 Oct. 20, 2016

Related U.S. Application Data

(63) Continuation of application No. 14/720,106, filed on May 22, 2015, now Pat. No. 9,351,025.

(60) Provisional application No. 62/149,376, filed on Apr. 17, 2015.

(51) Int. Cl.
| | |
|---|---|
| H04N 7/16 | (2011.01) |
| G06F 21/10 | (2013.01) |
| H04N 21/24 | (2011.01) |
| H04N 21/235 | (2011.01) |
| H04N 21/233 | (2011.01) |
| H04N 21/234 | (2011.01) |

(Continued)

(52) U.S. Cl.
CPC .............. *G06F 21/10* (2013.01); *G06F 21/64* (2013.01); *H04N 21/233* (2013.01); *H04N 21/2353* (2013.01); *H04N 21/23418* (2013.01); *H04N 21/2407* (2013.01); *H04N 21/812* (2013.01)

(58) Field of Classification Search
CPC ....... H04N 21/44608; H04N 21/44222; H04N 21/235; H04N 7/173
USPC .............. 725/91–93, 98, 114–119, 144–149, 725/14–19; 709/224, 229, 213, 232
See application file for complete search history.

(56) References Cited

U.S. PATENT DOCUMENTS

| | | | |
|---|---|---|---|
| 8,194,618 B2* | 6/2012 | Iochi | H04W 48/12 370/335 |
| 8,223,789 B2* | 7/2012 | Kato | H04L 5/0016 370/312 |
| 9,443,269 B2* | 9/2016 | Battyani | G06Q 40/04 |

(Continued)

*Primary Examiner* — Annan Shang
(74) *Attorney, Agent, or Firm* — Ropes & Gray LLP

(57) ABSTRACT

Systems and methods are disclosed herein for an Automatic Content Recognition (ACR) system that determines whether affiliates are adhering to criteria set by content providers. The ACR system, using control circuitry, receives a portion of a media asset, determines a content signature for the portion of the media asset based on audio or visual information presented in the media asset, cross-references the content signature with a database listing a plurality of reference signatures that adhere to a criterion set by a content provider, determines whether the portion adheres to the criterion, and automatically notifies the content provider in response to determining that the portion does not adhere to the criterion. The ACR system includes storage circuitry to store the database.

20 Claims, 5 Drawing Sheets

(51) Int. Cl.
*H04N 21/81* (2011.01)
*G06F 21/64* (2013.01)

(56) References Cited

U.S. PATENT DOCUMENTS

| | | | |
|---|---|---|---|
| 9,489,544 B2 * | 11/2016 | Naitou | G06F 21/85 |
| 2003/0200548 A1 * | 10/2003 | Baran | H04L 29/06027 |
| | | | 725/90 |
| 2005/0086360 A1 * | 4/2005 | Mamou | G06F 17/30563 |
| | | | 709/232 |
| 2006/0178997 A1 * | 8/2006 | Schneck | G06F 21/10 |
| | | | 705/50 |
| 2012/0005238 A1 * | 1/2012 | Jebara | G06Q 10/04 |
| | | | 707/798 |
| 2014/0236737 A1 * | 8/2014 | Rowe | H04H 60/372 |
| | | | 705/14.68 |
| 2017/0078154 A1 * | 3/2017 | Ansari | H04L 41/12 |

* cited by examiner

SYSTEMS AND METHODS FOR PROVIDING AUTOMATIC CONTENT RECOGNITION TO VERIFY AFFILIATE PROGRAMMING

CROSS REFERENCE TO RELATED APPLICATION

This application is a continuation of U.S. patent application Ser. No. 14/720,106, filed May 22, 2015, which claims the benefit under 35 U.S.C. §119(e) of U.S. Provisional Application No. 62/149,376, filed on Apr. 17, 2015, both of which are incorporated herein by reference in their entirety.

BACKGROUND

In conventional systems, content providers may have rights to provide certain media assets to users. In some embodiments, these rights may be exclusive rights so that only a particular content provider has rights to provide a certain media asset to users. Content providers may have these rights because they produce the media assets, or because they own the media assets. Content providers may allow their affiliates to provide the media assets to the affiliates' users. By doing so, a content provider may increase the number of users who have access to the media assets. Their affiliates may agree to display the media assets while adhering to the criteria set by the content providers. By doing so, their affiliates may increase the number of media assets they are able to provide to their users.

Content providers may provide contractual obligations for affiliates to fulfill when they transmit the media assets that content providers have rights to. Content providers may wish enforce the contractual obligations by determining whether the affiliates are transmitting media assets in a manner that fulfills the contractual obligations.

SUMMARY

Accordingly, systems and methods are disclosed herein for determining whether affiliates are adhering to criteria set by content providers. A content provider may set criteria to ensure that affiliates provide media content to their users only in a manner that does not adversely impact the content provider. A content provider may wish to determine whether an affiliate is adhering to the criteria set by the content provider to insure its interests are being protected. For example, a content provider may be a broadcast station in New York City, and it may have an affiliate with broadcast stations in several cities in New York State including New York City. The content provider may provide a television show to the affiliate and set criteria that the affiliate is allowed to broadcast the television show to all cities in New York State excluding New York City. Hence, the content provider may ensure its own viewership is not impacted by the affiliate's broadcasting activities. The content provider may wish to determine that the affiliate is adhering to the criterion by not broadcasting the television show in New York City. The content provider may use an Automatic Content Recognition (ACR) system to make this determination.

In some aspects, the ACR system may receive a portion of a media asset from an affiliate. For example, the ACR system may receive a frame of a television show from an affiliate. The portion of the media asset may contain audio information and/or video information. For example, a frame of a television show received by the ACR system from an affiliate may have image data and sound data associated with it.

The ACR system may determine a content signature for the received portion of the media asset, wherein the content signature is based on audio or visual information presented to a user in the portion. For example, the ACR system may receive a frame of a television show and determine what image and sound data is contained in the frame. The ACR system may calculate a content signature for the frame by performing functions using the image and sound data in the frame as input.

The ACR system may cross-reference the content signature with a database listing a plurality of reference signatures that adhere to a criterion set by a content provider to determine whether the portion adheres to the criterion. In some embodiments, the plurality of reference signatures may be content signatures for a media asset that the affiliate is scheduled to broadcast. For example, the affiliate's EPG schedule may contain information that an affiliate will broadcast a television show "Iron Chef" at 9:00 pm. The reference signatures may be content signatures for frames of the television show "Iron Chef".

In some embodiments, the ACR system may determine that the portion does not adhere to the criterion based on determining that the content signature does not correspond to a reference signature. For example, the ACR system may determine that the content signature of a frame received at 9:00 pm from the media asset received from the affiliate does not match any of the reference signatures associated with "Iron Chef". The criterion set by the content provider may be that the affiliate must broadcast the television program "Iron Chef" at 9:00 pm. Hence, the ACR system may determine that the portion does not adhere to the criterion set by the content provider.

The ACR system may automatically notify the content provider that the portion does not adhere to the criterion in response to determining that the portion does not adhere to the criterion. The ACR system may notify the content provider of all portions that do not adhere to the criteria set by the content provider at certain predetermined intervals, or it may send notifications immediately upon determining that a portion does not adhere to a criterion. In some embodiments, the ACR system may notify the content provider only if a threshold number of content signatures do not adhere to the criterion. In some embodiments, the ACR system may automatically notify the content provider that the portion adheres to the criterion as well.

In some embodiments, the ACR system may receive the portion of the media asset from a head-end of the affiliate. For example, the ACR system may receive signals directly from a broadcasting station of the affiliate. In some embodiments, the ACR system may receive the portion of the media asset from a user equipment device of a user. For example, the ACR system may retrieve information that is provided by the affiliate and presented on a user's television screen or output through a user's speakers.

In some embodiments, the criterion may be based on one of a time window in which a media asset can be presented, a location in which the media asset can be presented, and a user demographic to which the media asset can be presented. For example, the criterion may describe that the affiliate is allowed to provide the media asset to its users only during certain time windows such as between 7:00 pm and 9:00 pm, at certain locations such as only in New York City, or when its users belong to a certain demographic such as users of the affiliates' mobile device applications. In some embodiments, the reference signatures may adhere to the criterion set by the content provider. For example, the reference frames may be associated with a broadcast of the television show "Iron Chef" at 9:00 pm, and the affiliate may be allowed to broadcast the television show "Iron Chef" at 9:00 pm.

In some embodiments, the cross-referencing may comprise cross-referencing a threshold number of content signatures with the plurality of reference signatures. For example, the ACR system may have a threshold of five, which would lead it to cross-reference five received frames from a television show broadcast by an affiliate to reference frames from a broadcast of the television program "Iron Chef". In some embodiments, the ACR system may determine the content signature corresponds to a reference signature if one of a threshold number of content signatures corresponds to the reference signature. For example, if one of the five content signatures determined for the five frames received from the television show broadcast by the affiliate corresponds to a reference signature, the ACR system may determine that the television show adheres to the criterion set by the content provider.

In some embodiments, the ACR system may associate metadata of the reference signatures to the portion upon determining that a reference signature corresponds to a content signature. For example, The ACR system may receive metadata describing the title ("Iron Chef") of the television program from which the reference signatures were determined. If the content signature corresponds to one of the plurality of reference signatures, then the ACR system may associate the title "Iron Chef" with the portion of the media asset received from the affiliate.

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will be apparent upon consideration of the following detailed description, taken in conjunction with the accompanying drawings, in which life reference characters refer to like parts throughout, and in which.

DETAILED DESCRIPTION

Figure 1:
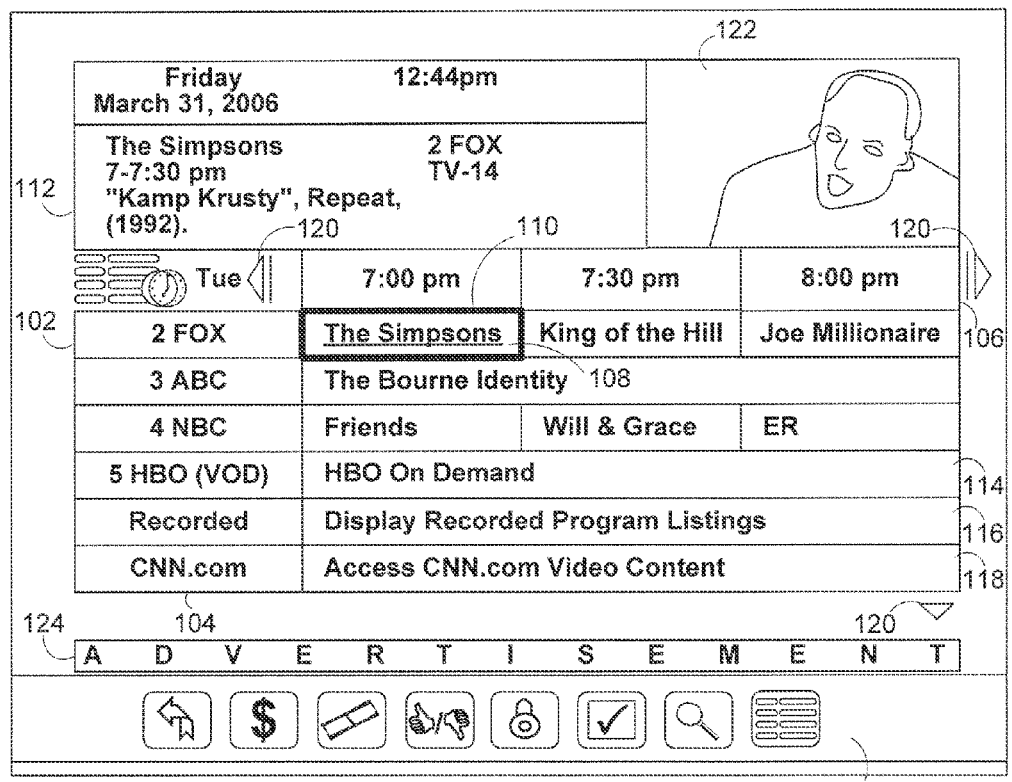
FIG. 1 shows an illustrative example of a display screen generated by a media guidance application in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application. In some cases, the media guidance application may function as an Automatic Content Recognition (ACR) system. Thus, it should be noted that any embodiments relating to a media guidance application may also relate to an ACR system.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The ACR system and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
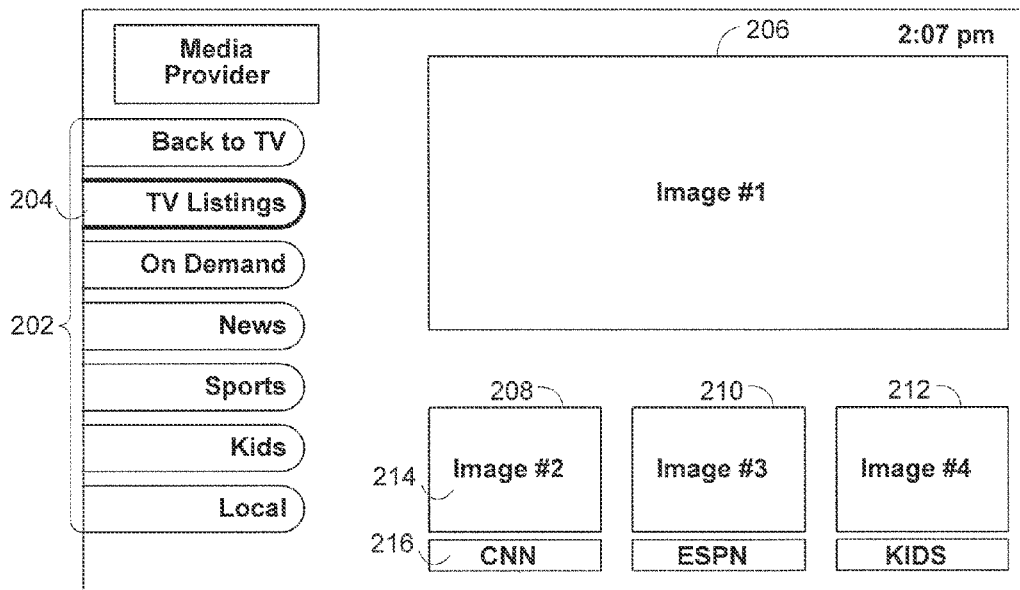
FIG. 2 shows another illustrative example of a display screen generated by a media guidance application in accordance with some embodiments of the disclosure.

FIGS. 1-2 show illustrative display screens that may be used to provide media guidance data. For example, media assets to which the ACR system is applied may be selected by a user through the display screens shown in FIGS. 1-2. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
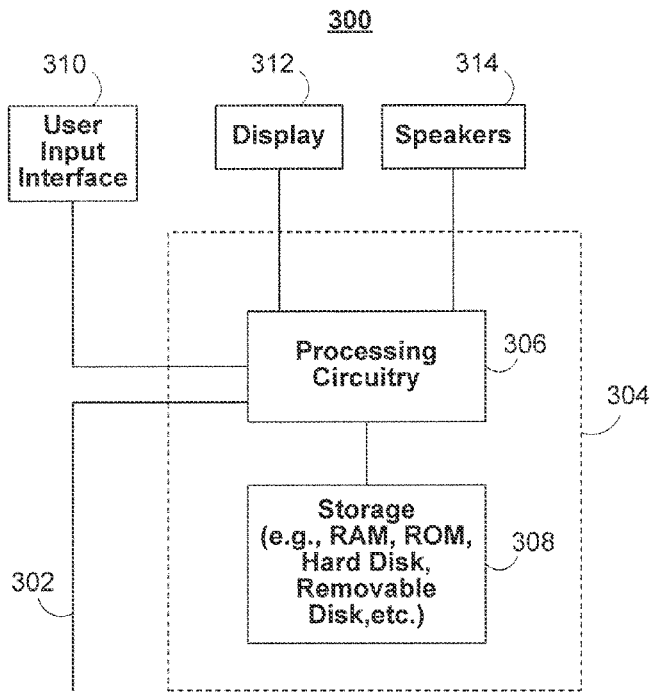
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet programming, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
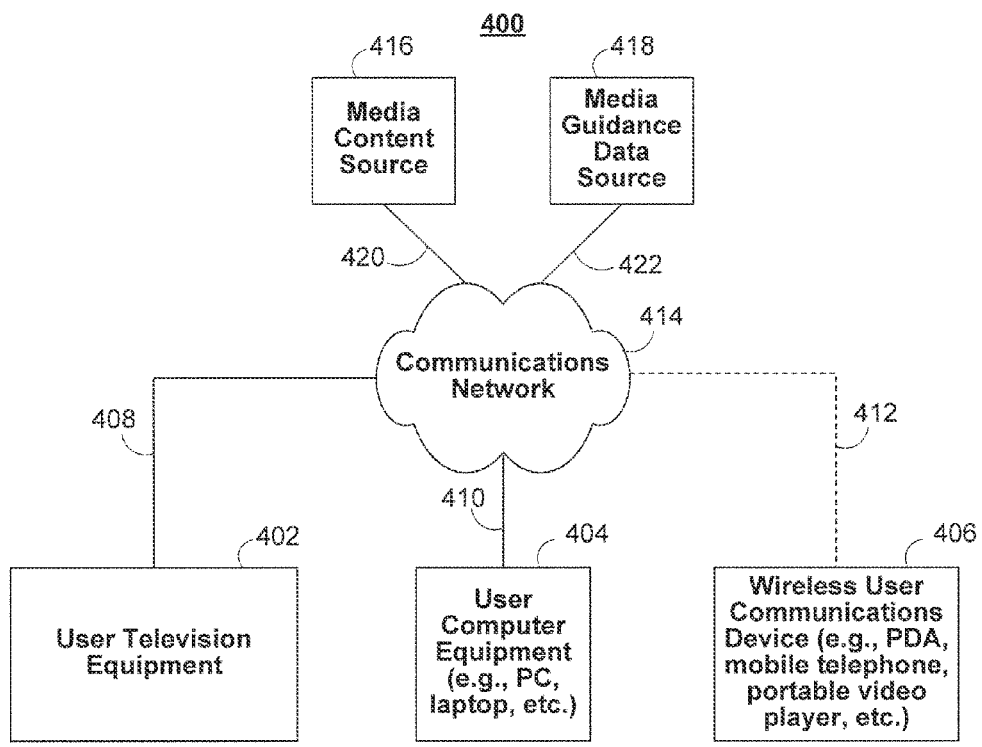
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412.

Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404.

The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
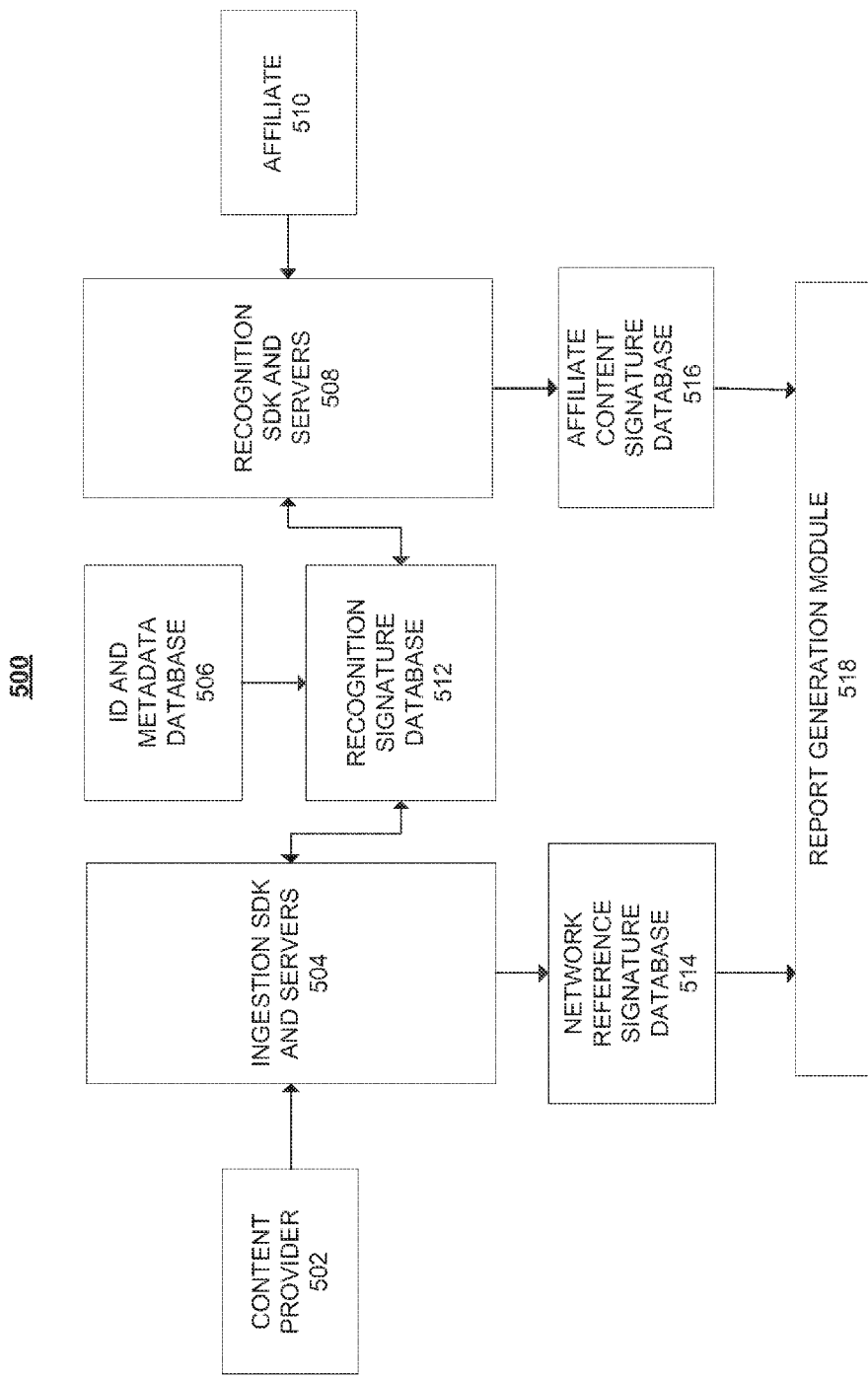
FIG. 5 is a block diagram of an illustrative Automatic Content Recognition system in accordance with some embodiments of the disclosure.

FIG. 5 is a block diagram of an illustrative Automatic Content Recognition (ACR) system in accordance with some embodiments of the disclosure. The ACR system may be a component of a user equipment device 300 and/or media system 400. The ACR system may include control circuitry 304 which contains processing circuitry 306 and storage circuitry 308. The ACR system may use communications network 414 to transmit and receive information.

Block diagram 500 illustrates an ACR system including ingestion SDK ("Software Development Kit") and servers 504, ID and metadata database 506, recognition SDK and servers 508, recognition signature database 512, network reference signature database 514, affiliate content signature database 516, and report generation module 518. In some embodiments, content provider 502 and affiliate 510 may not be components of the ACR system. Ingestion SDK and servers 504 and recognition SDK and servers 508 may include control circuitry 304. ID and metadata database 506, recognition signature database 512, network reference signature database 514, and affiliate content signature database 516 may include storage circuitry 308. Report generation module 518 may be connected to communications network 414 and include control circuitry 304. Though only one of each component is illustrated in block diagram 500, it is understood that the ACR system may have any number of any of the components of block diagram 500. For example, report generation module 518 may receive reference and content signatures from multiple content providers and affiliates.

As referred to herein, a content provider (e.g., content provider 502) may include a media content source (e.g., media content source 416). The content provider may be any source of media content and is not limited to broadcast sources. As referred to herein, media content and media assets are used interchangeably. The content provider may include broadcast sources, as well as a peer-to-peer media asset provider, or an on-demand media asset provider. The content provider may provide or transmit media content to a combination of other broadcast transmission sources, affiliates and/or users. The content provider may provide or transmit media content to users at user devices (e.g., user television equipment 402, user computer equipment 404, and wireless user communications device 406) through a communications medium (e.g., communications network 414). For example, a broadcast transmission source may be a network provider such as the network "The CW," which provides original content owned by the network provider "The CW".

The content provider may own rights to a media asset. For example, the network "The CW" may own the rights to the television program series "Gossip Girl" as the network created the series. In some embodiments, the content provider may own the rights to a media asset because the content provider purchased rights to the media asset. Owning rights to a media asset may allow the content provider to determine how the media asset should be provided to users.

As referred to herein, an affiliate (e.g., affiliate 510) may be any entity which receives permission from the content provider to provide media assets, to which the content provider has rights, to users. The affiliate may provide media assets to user devices (e.g., user television equipment 402, user computer equipment 404, and wireless user communications device 406) through a communications medium (e.g., communications network 414). In some embodiments, affiliates may provide media assets to other affiliates. In some embodiments, a single media content source (e.g., media content source 416) may be a content provider (e.g., content provider 502) for a first media asset to which it has rights, and it may be an affiliate (e.g., affiliate 510) for a second media asset to which it does not have rights. For example, affiliate 510 may be a local television station such as "WPIX" which is a New York affiliate of the network provider "The CW" (i.e., content provider 502).

The content provider (e.g., content provider 502) may enter into a contract with the affiliate (e.g., affiliate 510) to allow the affiliate to transmit media assets to which the affiliate does not have the rights but to which the content provider has rights. The content provider may determine a set of criteria that the affiliate must fulfill when transmitting media content to which the content provider has rights. Thus, the affiliate may have an obligation to adhere to criteria set by the content provider. The content provider may wish to be notified when the affiliate does not adhere to criteria set by the content provider. The content provider may stop allowing access to media content to which the content provider has rights to the affiliate if the affiliate does not adhere to the criteria.

As referred to herein, criteria include conditions set by the content provider (e.g., content provider 502) that the affiliate (e.g., affiliate 510) must adhere to when transmitting media assets to which the content provider has rights. The criteria may govern any aspect of the delivery, presentation, and/or distribution of content. For example, the content provider may require that the affiliate transmit a certain media asset only at certain times, or only to certain locations. The content provider may require that the affiliate transmit a certain media asset a maximum threshold number of times, or to certain user demographics. The content provider may require that the affiliate transmit a certain media asset to only a certain subset of users or a certain subset of user devices. The content provider may set any other type of criteria as well.

Ingestion SDK and servers 504 receive a media asset to which content provider 502 has rights from content provider 502 through communications network 414. The SDK in ingestion SDK and servers 504 may allow it to determine content signatures for received media assets, while the servers may allow it to communicate with content provider 502 and recognition signature database 512. In some embodiments, ingestion SDK and servers 504 may receive the media asset from a head-end of content provider 502. For example, if content provider 502 is a broadcasting station, ingestion SDK and servers 504 may receive the media asset though broadcast signals transmitted by content provider 502. In some embodiments, ingestion SDK and servers 504 may receive the media asset from users of content provider 502. For example, content provider 502 may be an online media streaming service that transmits media from its servers to user computer equipment 404 in an encrypted format through communications network 414. Ingestion SDK and servers 504 may not be able to receive a media asset directly from content provider 502 as the media asset may be encrypted. Hence, ingestion SDK and servers 504 may receive the media asset from user computer equipment 404 as user computer equipment 404 receives and decrypts the media asset. In some embodiments, the ACR system may include control circuitry connected to user television equipment 402, user computer equipment 404, or wireless user communications device 406 to enable it to receive media assets from user devices.

In some embodiments, ingestion SDK and servers 504 may receive media assets from content provider 502 at predetermined intervals. For example, ingestion SDK and servers 504 may receive media assets from content provider 502 every five sections, or may receive one of every ten frames that content provider 502 transmits to users. In some embodiments, ingestion SDK and servers 504 may receive media assets from content provider 502 when content provider 502 is triggered by predetermined actions. As referred to herein, predetermined actions may refer to content provider 502 setting new criteria for affiliate 510, content provider 502 beginning to transmit a new media asset, content provider 502 setting criteria for new affiliate 510, content provider 502 receiving a user request (e.g., for an on-demand media asset), and other similar actions.

In some embodiments, ingestion SDK and servers 504 may be a distributed network of devices that communicate using communications network 414. For example, ingestion SDK and servers 504 may include a set of devices located at user devices 402, 404, and 406 and receiving media assets from the user devices, and a head-end which receives media assets from the set of devices. In some embodiments, the set of devices may be configured to transmit a limited number of portions of media content to conserve power at the user devices. In some embodiments, each device in the distributed network of devices that forms ingestion SDK and servers 504 may have different capabilities because each device may use a different SDK. This may lead to each device having different features and functionality, but still being capable of communicating with other devices.

In some embodiments, content provider 502 may transmit only a portion of a media asset to ingestion SDK and servers 504. For example, content provider 502 may transmit only a few frames of media assets to which it has rights. In some embodiments, ingestion SDK and servers 504 may isolate a portion of media assets received from content provider 502. For example, ingestion SDK and servers 504 may select a frame of a television program received from content provider 502. Ingestion SDK and servers 504 may select a frame at predetermined intervals, such as one of every ten frames or one frame every minute, or may select frames tagged with metadata by content provider 502 that marks them as important or special frames.

Ingestion SDK and servers 504 may create a content signature for the portion of the media asset received from content provider 502. The content signature may be created using audio or visual information present in the portion of the media asset. Visual information may be information presented through display 312 of a user device, while audio information may be information presented through speakers 314 of a user device. For example, pixel color values in a frame of a television program received from content provider 502 may be used to calculate a content signature. In another example, wavelength amplitudes and frequencies derived from audio data associated with a portion of a movie received from content provider 502 may be used to calculate the content signature. The content signature may be calculated using hash functions, look-up table entries, or mathematical functions. In some embodiments, both audio and visual data may be combined when creating the content signature. In some embodiments, the content signatures may be unique for each portion of a media asset. In some embodiments, the content signatures may not be unique, and there may be a probability that content signatures of different portions of different media assets are identical.

In some embodiments, recognition SDK and servers 508 may be similar to the ingestion SDK and servers 504, with the exception that recognition SDK and servers 508 media content from affiliate 510 and not from content provider 502. In some embodiments, recognition SDK and servers 508 may receive media content only from users of affiliate 510, and not from a head-end, to accurately determine what media assets affiliate 510 is transmitting to its users.

Content provider 502 may provide metadata information about media assets to ID and metadata database 506 through communications network 414. ID and metadata database 506 may also receive information from media guidance data source 418 through communications network 414. ID and metadata database 506 may include information about metadata of media assets, such as their titles, parental control ratings, summaries, ratings, creation date, and the like. ID and metadata database 506 may also contain a unique ID for each media asset that content provider 502 or affiliate 510 transmits.

Recognition signature database 512 receives content signatures for the media assets provided by content provider 502 (referred to as "reference signatures") through ingestion SDK and servers 504. Recognition signature database 512 receives content signatures for media assets provided by affiliate 510 through recognition SDK and servers 508. Recognition signature database 512 may use information from the reference signatures and content signatures to determine a unique ID and metadata associated with the reference signatures and content signatures. For example, recognition signature database 512 may receive a reference signature from a frame in the television show "Iron Chef" received from content provider 502. Recognition signature database 512 may analyze the reference signature to determine it was created from the television show "Iron Chef". Recognition signature database 512 may retrieve a unique ID and metadata such as a producer for "Iron Chef" and its air dates from ID and metadata database 506 and associate these with the reference signature.

In some embodiments, recognition signature database 512 uses heuristics to associate an ID and metadata with received reference signatures and content signatures. For example, recognition signature database 512 may access electronic program guides provided by content provider 502 and affiliate 510 to determine which media assets they are likely to transmit, and then determine that the reference and content signatures are associated with the ID and metadata for these media assets. In some embodiments, recognition signature database 512 may include a listing of features unique to content signatures from different media assets. For example, recognition signature database 512 may include a listing that content signatures from the television program "Iron Chef" are likely to fall within a certain range of values. When recognition signature database 512 receives a reference signature, it may compare the value of the reference signature to the range and associate an ID and metadata for "Iron Chef" with the reference signature if its value falls within the range.

In some embodiments, content provider 502 may provide metadata identifying a media content it is transmitting to ingestion SDK and servers 504 along with the media content itself. Ingestion SDK and servers 504 may provide this identifying metadata to recognition signature database 512. Recognition signature database 512 may then determine an ID and metadata for the reference signature using the identifying metadata provided by content provider 502. If a content signature received from recognition SDK and servers 508 corresponds to the reference signature, recognition signature database 512 may associate the same ID and metadata with the content signature. For example, content provider 502 may provide a frame from "Iron Chef" to ingestion SDK and servers 504 along with metadata identifying the title of the program. Ingestion SDK and servers 504 may transmit a reference signature for the frame and the title "Iron Chef" to recognition signature database 512. Recognition signature database 512 may use the title to retrieve a unique ID for the program "Iron Chef" from ID and metadata database 506, and associate this with the reference signature. Recognition signature database 512 may receive metadata about a producer of the program "Iron Chef" from ID and metadata database 506 and associate this with the reference signature. Recognition signature database 512 may then receive a content signature from recognition SDK and servers 508. Recognition signature database 512 may determine the content signature matches the reference signature, and associate the unique ID and producer information for the program "Iron Chef" with the content signature as well.

Recognition signature database 512 may maintain a log of received reference and content signatures, and their associated unique IDs and metadata. Content provider 502 or affiliate 510 may be able to access the log in recognition signature database 512 through communications network 414 to analyze their transmissions.

In some embodiments, ingestion SDK and servers 504 may transmit reference signatures to network reference signature database 514. In some embodiments, network reference signature database 514 may store a predetermined number of reference signatures in a first-in-first-out queue for processing by report generation module 518. In some embodiments, network reference signature database 514 may store reference signatures unless it receives instructions to delete them from ingestion SDK and servers 504. Ingestion SDK and servers 504 may periodically instruct network reference signature database 514 to delete reference signatures. In some embodiments, ingestion SDK and servers 504 may directly transmit the reference signatures to report generation module 518 for storing and processing. Affiliate content signature database 516 may be similar to network reference signature database 514.

Report generation module 518 may receive reference signatures from ingestion SDK and servers 504 or from network reference signature database 514. Report generation module 518 may also receive content signatures from recognition SDK and servers 508 or from affiliate content signature database 516. Report generation module 518 may compare the reference signatures received to the content signatures received to determine whether affiliate 510 is adhering to the criteria set by content provider 502. Report generation module 518 may compare the content signature and the reference signature such that differences caused to the portion of the media asset received from affiliate 510 due to transformations such as rotation, flipping, displaying subtitles, cropping, rescaling, or format transcoding are ignored as they do not effect the content of the portion of the media asset.

In some embodiments, reference signatures may correspond to a media asset that affiliate 510 is allowed to transmit to users. For example, reference signatures received at 9:00 pm by report generation module 518 may be from the television program "Iron Chef" because affiliate 510 would be adhering to criteria set by content provider 502 if it transmitted "Iron Chef" at 9:00 pm to users. If a reference signature and the content signature received at 9:00 pm correspond, report generation module 518 may determine that affiliate 510 is adhering to criteria set by content provider 502. If the content signature does not correspond to any of the reference signatures, report generation module 518 may determine that affiliate 510 is not adhering to the criteria.

In some embodiments, reference signatures may correspond to a media asset that affiliate 510 is not allowed to transmit to users. For example, reference signatures received for the location of "New York City" by report generation module 518 may be from the television program "Gossip Girl" because affiliate 510 would not be adhering to criteria set by content provider 502 if it transmitted "Gossip Girl" to users in New York City. If a reference signature and content signature received from New York City correspond, report generation module 518 may determine that affiliate 510 is not adhering to criteria set by content provider 502. If the content signature does not correspond to any of the reference signatures, report generation module 518 may determine that affiliate 510 is adhering to the criteria.

In some embodiments, report generation module 518 may compare a threshold number of content signatures to reference signatures to determine whether a content signature corresponds to a reference signature. For example, report generation module 518 may receive ten reference signatures and ten content signatures. Report generation module 518 may have a pre-determined threshold of three. Report generation module may compare three received content signatures to all ten reference signatures to determine whether any content signatures correspond to any of the reference signatures. The three content signatures may be chosen randomly, or in order of receipt from affiliate content signature database 516 or recognition SDK and servers 508. Comparing a threshold number of content signatures may allow report generation module 518 to account for the possibility of two content signatures for the same portion of a media asset being different.

In some embodiments, report generation module 518 may receive criteria from content provider 502 and a unique ID associated with the media asset transmitted by affiliate 510 from recognition signature database 512. Report generation module 518 may cross-reference these to determine whether affiliate 510 is adhering to criteria set by content provider 502. For example, report generation module 518 may receive criteria from content provider 502 describing that affiliate 510 is allowed to transmit only the first season of the television program "Iron Chef" and not any subsequent seasons. Report generation module 518 may receive a unique ID from recognition signature database 512 indicating that affiliate 510 is currently transmitting an episode from the second season of "Iron Chef" to users. Report generation module 518 may use this information to determine that affiliate 510 is not adhering to criteria.

Report generation module 518 may maintain a log of content signatures from affiliate 510 that adhere to criteria set by content provider 502, and content signatures from affiliate 510 that do not adhere to criteria set by content provider 502. Content provider 502 may be able to access this log.

In some embodiments, report generation module 518 may determine that a media asset transmitted by affiliate 510 adheres to criteria set by content provider 502 if a threshold number of content signatures from the media asset adhere to the criteria. For example, report generation module 518 may determine that five content signatures from a movie transmitted by affiliate 510 adhere to the criteria set by content provider 502. Report generation module 518 may compare the number of content signatures that adhere to the criteria to a predetermined threshold of three. Based on the number of content signatures being higher than the threshold, report generation module 518 may determine that the movie transmitted by affiliate 510 adheres to the criteria. In some embodiments, report generation module 518 may determine that a media asset transmitted by affiliate 510 does not adhere to the criteria set by content provider 502 if a threshold number of content signatures from the media asset do not adhere to the criteria.

In some embodiments, report generation module 518 may automatically notify content provider 502 when it determines a content signature or media asset does not adhere to the criteria set by content provider 502. In some embodiments, report generation module 518 may automatically notify content provider 502 when it determines a content signature or media asset adheres to the criteria. In some embodiments, report generation module 518 may notify content provider 502 of updates to its log at predetermined intervals.

Figure 6:
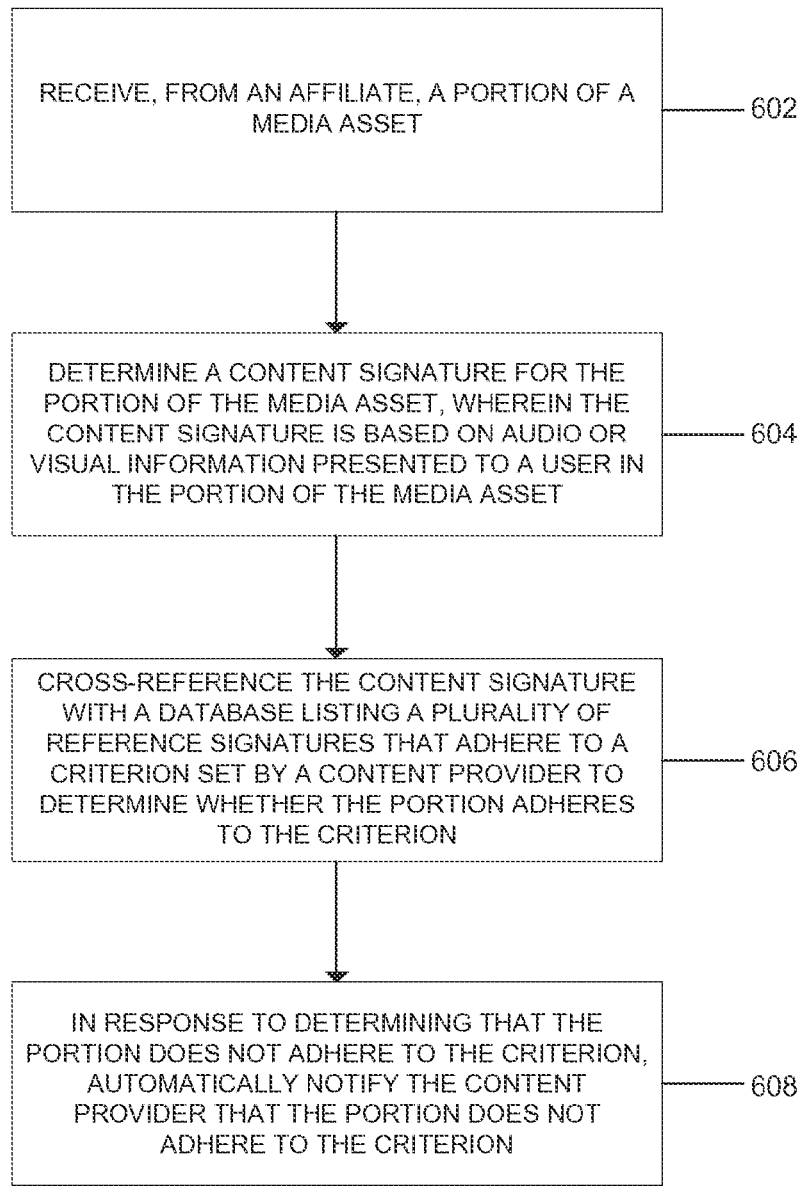
FIG. 6 is a flow chart of an illustrative process for determining whether affiliates are adhering to criteria set by content providers in accordance with some embodiments of the disclosure.

FIG. 6 is a flow chart of an illustrative process for determining whether affiliates are adhering to criteria set by content providers in accordance with some embodiments of the disclosure. It should be noted that the process 600 or any step thereof could be performed on, or provided by, any of the devices shown in FIGS. 3-5. For example, process 600 may be executed by processing circuitry 304 (FIG. 3) as instructed by processing circuitry implemented on user equipment 402, 404, and/or 406 (FIG. 4) in order to provide information to a user. In addition, one or more steps of process 700 may be incorporated into or combined with one or more steps of any other process or embodiment.

Process 600 begins at step 602 when the ACR system receives a portion of a media asset from affiliate 510 through communications network 414. The portion may be received at recognition SDK and servers 508. The ACR system may use the portion instead of electronic program guide data provided by affiliate 510 to determine if affiliate 510 is adhering to criteria set by content provider 502 because electronic program guide data may be outdated or incorrect. The portion of a media asset may be a frame of the media asset transmitted by affiliate 510, such as a frame of a movie. In some embodiments, the ACR system receives a portion of the media asset at fixed intervals. In some embodiments, the ACR system receives a portion of the media asset at random intervals determined by content provider 502 or recognition SDK and servers 508. In some embodiments, the ACR system receives a portion of the media asset when triggered by events such as affiliate 510 receiving a channel change indication from user television equipment 402, video-on-demand request from wireless user communications device 406, powering on of user computer equipment 404, and the like. The ACR system may detect these triggers at user devices 402, 404, and 406 using circuitry from recognition SDK and servers 508 present in the user devices.

Process 600 proceeds to step 604 when the ACR system determines a content signature for the portion of the media asset, wherein the content signature is based on the audio or visual information presented to a user in the portion of the media asset. For example, recognition SDK and servers 508 may use control circuitry 304 to determine a content signature for a received portion of a media asset such as a frame of a movie. The content signature may be determined using visual information presented to the user through display 312 and audio information presented to the user through speakers 314.

Process 600 proceeds to step 606 when the ACR system cross-references, using control circuitry 304, the content signature with a database, stored using storage circuitry 308, listing a plurality of reference signatures that adhere to a criterion set by content provider 502 to determine whether the portion adheres to the criterion. For example, report generation module 518 may use control circuitry 304 to determine whether the content signature corresponds to any of the content signatures stored in network reference signature database 514. The reference signatures in network reference signature database 514 may adhere to the criterion set by content provider 502. The ACR system may determine that the portion does not adhere to the criterion if the content signature does not correspond to any reference signature in network reference signature database 514.

Process 600 proceeds to step 608 when the ACR system, in response to determining that the portion does not adhere to the criterion, automatically notifies through communications network 414 content provider 502 that the portion does not adhere to the criterion. In some embodiments, the ACR system may notify content provider 502 that affiliate 510 does not adhere to the criterion. In some embodiments, the ACR system may notify content provider 502 when the portion does adhere to the criterion. In some embodiments, the ACR system may maintain a log of portions that do and do not adhere to the criterion.

Figure 7:
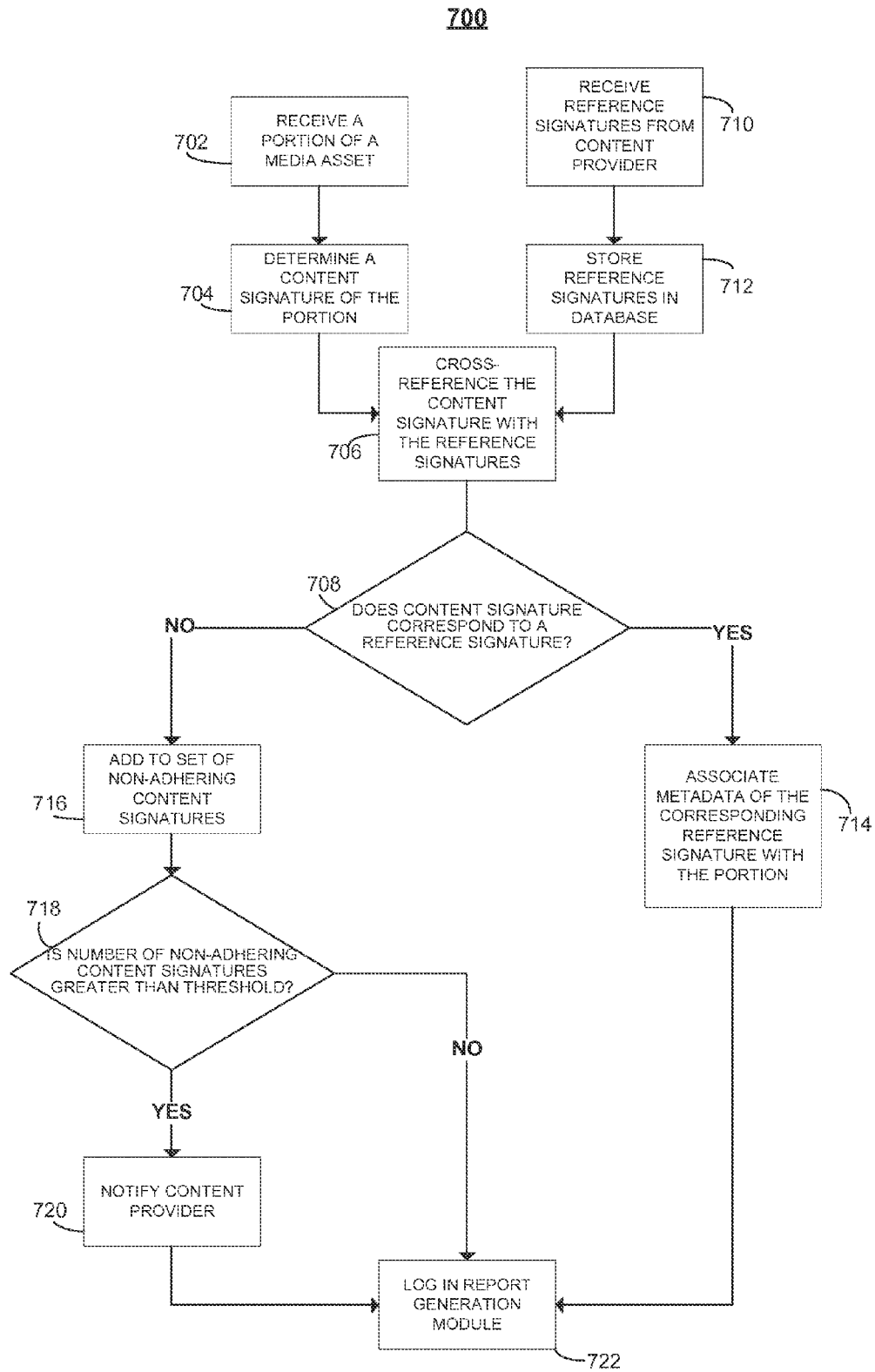
FIG. 7 is a flow chart of an illustrative process for processing data in an Automatic Content Recognition system in accordance with some embodiments of the disclosure.

FIG. 7 is a flow chart of an illustrative process for processing data in an Automatic Content Recognition system in accordance with some embodiments of the disclosure. It should be noted that the process 700 or any step thereof could be performed on, or provided by, any of the devices shown in FIGS. 3-5. For example, process 700 may be executed by processing circuitry 304 (FIG. 3) as instructed by processing circuitry implemented on user equipment 402, 404, and/or 406 (FIG. 4) in order to provide information to a user. In addition, one or more steps of process 700 may be incorporated into or combined with one or more steps of any other process or embodiment.

Process 700 begins at steps 702 and 710. The ACR system receives a portion of a media asset at step 702, as described in relation to step 602. Process 700 proceeds to step 704 when the ACR system determines a content signature of the portion as described in relation to step 604.

The ACR system also receives reference signatures from content provider 502 at step 710. This may happen through ingestion SDK and servers 504. The ACR system may perform steps 702 and 710 simultaneously, or in series.

Process 700 proceeds to step 712 when the ACR system stores reference signatures in network reference signature database 514 using storage circuitry 308. In some embodiments, the ACR system may store reference signatures in report generation module 518. In some embodiments, the ACR system may store the content signature in affiliate content signature database 516.

Process 700 proceeds to step 706 when the ACR system cross-references the content signature with the reference signatures using control circuitry 304 in report generation module 518. This may happen as described in relation to step 606.

In some embodiments, the reference signatures may adhere to a criterion set by content provider 502. If the content signature corresponds to a reference signature, the ACR system may determine that the portion of the media asset adheres to the criterion. Process 700 proceeds to step 708 when the ACR system determines whether the content signature corresponds to a reference signature. If the content signature corresponds to a reference signature, then the ACR system determines that the portion of the media asset adheres to the criteria. Process 700 may then proceed to step 714 where the ACR system associates metadata of the reference signature with the portion as described in relation to recognition signature database 512.

If the ACR system determines at step 708 that the content signature does not correspond to a reference signature, process 700 proceeds to step 716 when the ACR system adds the content signature to a set of non-adhering content signatures. The set of non-adhering content signatures may be stored in a log in report generation module 518 using storage circuitry 308. In some embodiments, the ACR system may update a counter associated with the number of non-adhering content signatures instead of storing the content signature. In some embodiments, the ACR system may store an identifier of the portion of the media asset, such as the time and date it was received at step 702, instead of the content signature.

Process 700 proceeds to step 718 when the ACR system determines whether the number of non-adhering content signatures is greater than a threshold. The threshold value may be predetermined, or it may be set by content provider 502. If the threshold is exceeded, the ACR system may notify content provider 502 through report generation module 518 at step 720. The notification may include information about non-adhering content signatures, non-adhering portions of media assets, or updates made to the log since the last notification. The ACR system may empty the set of non-adhering content signatures or reset a counter associated with the number of non-adhering content signatures. If the threshold at step 718 is not exceeded, the ACR system may add a new log entry to the log in report generation module 518. Process 700 may then begin again at step 702 and/or step 710 by receiving a new portion of a media asset or a new plurality of reference signatures.

It is contemplated that the steps or descriptions of FIG. 6 and/or FIG. 7 may be used with any other embodiment of this disclosure. In addition, the steps and descriptions described in relation to FIG. 6 and/or FIG. 7 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for determining whether a first party is adhering to criteria set by a second party, the method comprising:
   receiving, from a first party, a portion of a media asset;
   extracting from the portion audio or visual information presented to a user in the portion;
   computing, using a function, a content signature for the portion, wherein the content signature is based on the audio or visual information presented to the user in the portion;
   cross-referencing the content signature with a database listing a plurality of reference signatures from a second party to determine whether the content signature corresponds to at least one of the plurality of reference signatures;
   based on determining that the content signature does correspond to the at least one of the plurality of reference signatures, storing an association between the content signature and metadata associated with the at least one of the plurality of reference signatures; and
   based on determining that the content signature does not correspond to the at least one of the plurality of reference signatures, automatically notifying the second party.

2. The method of claim 1, wherein the content signature corresponds to the at least one of the plurality of reference signatures when the value of the content signature falls within a range of values associated with the at least one of the plurality of reference signatures.

3. The method of claim 1, wherein the portion of the media asset is a portion of a first media asset, and the plurality of reference signatures are content signatures for portions of a second media asset that the first party is scheduled to broadcast.

4. The method of claim 1, wherein the cross-referencing is based on criteria including one of a time window in which the media asset can be presented, a location in which the media asset can be presented, and a user demographic to which the media asset can be presented.

5. The method of claim 4, wherein the criteria are set by the second party.

6. The method of claim 1, wherein the cross-referencing further comprises cross-referencing a threshold number of content signatures with the plurality of reference signatures.

7. The method of claim 1, further comprising:
   based on determining that the content signature does not correspond to the at least one of the plurality of reference signatures, automatically notifying the first party.

8. The method of claim 1, wherein the database listing a plurality of reference signatures is based at least in part on electronic program guides provided by the second party.

9. The method of claim 1, wherein receiving the portion of the media asset further comprises receiving the portion of the media asset from a head-end of the first party.

10. The method of claim 1, wherein receiving the portion of the media asset further comprises receiving the portion of the media asset from a user equipment device of the user.

11. A system for determining whether a first party is adhering to criteria set by a second party, the system comprising:
   storage circuitry configured to store a database listing a plurality of reference signatures from a second party; and
   control circuitry configured to:
      receive, from a first party, a portion of a media asset;
      extract from the portion audio or visual information presented to a user in the portion;
      compute, using a function, a content signature for the portion, wherein the content signature is based on the audio or visual information presented to the user in the portion;
      cross-reference the content signature with the database to determine whether the content signature corresponds to at least one of the plurality of reference signatures;
      based on determining that the content signature does correspond to the at least one of the plurality of reference signatures, store an association between the content signature and metadata associated with the at least one of the plurality of reference signatures; and
      based on determining that the content signature does not correspond to the at least one of the plurality of reference signatures, automatically notify the second party.

12. The system of claim 11, wherein the content signature corresponds to the at least one of the plurality of reference signatures when the value of the content signature falls within a range of values associated with the at least one of the plurality of reference signatures.

13. The system of claim 11, wherein the portion of the media asset is a portion of a first media asset, and the plurality of reference signatures are content signatures for portions of a second media asset that the first party is scheduled to broadcast.

14. The system of claim 11, wherein the cross-referencing is based on criteria including one of a time window in which the media asset can be presented, a location in which the media asset can be presented, and a user demographic to which the media asset can be presented.

15. The system of claim 14, wherein the criteria are set by the second party.

16. The system of claim 11, wherein the control circuitry configured to cross-reference the content signature is further configured to cross-reference a threshold number of content signatures with the plurality of reference signatures.

17. The system of claim 11, the control circuitry further configured to:
   based on determining that the content signature does not correspond to the at least one of the plurality of reference signatures, automatically notify the first party.

18. The system of claim 11, wherein the database listing a plurality of reference signatures is based at least in part on electronic program guides provided by the second party.

19. The system of claim 11, wherein the control circuitry configured to receive the portion of the media asset is further configured to receive the portion of the media asset from a head-end of the first party.

20. The system of claim 11, wherein the control circuitry configured to receive the portion of the media asset is further configured to receive the portion of the media asset from a user equipment device of the user.

* * * * *